US012744240B2

(12) United States Patent
Hu et al.

(10) Patent No.: US 12,744,240 B2
(45) Date of Patent: Sep. 22, 2026

(54) SULFIDE ELECTROLYTES AND EFFICIENT METHODS FOR MAKING THE SAME

(71) Applicant: Florida State University Research Foundation, Inc., Tallahassee, FL (US)

(72) Inventors: Yan-Yan Hu, Tallahassee, FL (US); Bright Ogbolu, Tallahassee, FL (US); Thilina Nadeemali Dikella Dikella Gamaralalage, Tallahassee, FL (US); Pawan Ojha, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 16 days.

(21) Appl. No.: 19/193,188

(22) Filed: Apr. 29, 2025

(65) Prior Publication Data

US 2025/0337006 A1 Oct. 30, 2025

Related U.S. Application Data

(60) Provisional application No. 63/640,424, filed on Apr. 30, 2024.

(51) Int. Cl.

| | |
|---|---|
| ***H01M 10/0562*** | (2010.01) |
| ***C01F 11/20*** | (2006.01) |
| ***C01G 25/00*** | (2006.01) |
| ***G01N 27/333*** | (2006.01) |
| ***H01M 50/431*** | (2021.01) |

(52) U.S. Cl.

CPC ...... *H01M 10/0562* (2013.01); *C01G 25/006* (2013.01); *G01N 27/333* (2013.01); *H01M 50/431* (2021.01); *C01P 2002/72* (2013.01); *C01P 2002/82* (2013.01); *C01P 2002/85* (2013.01); *C01P 2002/86* (2013.01); *C01P 2002/88* (2013.01); *C01P 2004/03* (2013.01); *C01P 2006/40* (2013.01); *H01M 2300/008* (2013.01)

(58) Field of Classification Search

CPC ........... H01M 10/0562; H01M 50/431; H01M 2300/008; C01G 25/006; G01N 27/333; C01P 2002/72; C01P 2002/82; C01P 2002/85; C01P 2002/86; C01P 2002/88; C01P 2004/03; C01P 2006/40; C01F 11/20

See application file for complete search history.

(56) References Cited

PUBLICATIONS

Amorphization of halide solid electrolytes for lithium super-ionic conductivity, Xu et al., J. Mater. Chem. A, 2024, 12, 27694-27702.*

Aliovalent sulfur-substitution regulated highly amorphous Li2ZrCl6 solid electrolytes for all-solid-state lithium metal batteries, J. Hu, B. Chen, C. Shi et al., Journal of Energy Chemistry 111 (2025) 67-78.*

Polarizability-Enhanced Ionic Transport in Rare-Earth-Free Halide-Sulfide Electrolytes: Li2ZrSCl4—xBrx, T. N.D.D. Gamaralalage, P. K. Ojha, B. Ogbolu, M. M. Islam, T. Toheed, S. C. Wilkerson and Y. Hu, Chem. Sci., 2026, DOI: 10.1039/D5SC08802J.*

Shi, X.; Zeng, Z.; Sun, M.; Huang, B.; Zhang, H.; Luo, W.; Huang, Y.; Du, Y.; Yan, C. Fast Li-Ion Conductor of Li3HoBr6for Stable All-Solid-State Lithium-Sulfur Battery. Nano Lett 2021, 21 (21), 9325-9331. https://doi.org/10.1021/acs.nanolett.1c03573.

Tanaka, Y.; Ueno, K.; Mizuno, K.; Takeuchi, K.; Asano, T.; Sakai, A. New Oxyhalide Solid Electrolytes with High Lithium Ionic Conductivity >10 MS Cm-1 for All-Solid-State Batteries. Angewandte Chemie—International Edition 2023, 62 (13). https://doi.org/10.1002/anie.202217581.

Lunghammer, S.; Ma, Q.; Rettenwander, D.; Hanzu, I.; Tietz, F.; Wilkening, H. M. R. Bulk and Grain-Boundary Ionic Conductivity in Sodium Zirconophosphosilicate Na3Zr2(SiO4)2PO4 (NASICON). Chem Phys Lett 2018, 701, 147-150. https://doi.org/10.1016/j.cplett.2018.04.037.

Maughan, A. E.; Ha, Y.; Pekarek, R. T.; Schulze, M. C. Lowering the Activation Barriers for Lithium-Ion Conductivity through Orientational Disorder in the Cyanide Argyrodite Li6PS5CN. Chemistry of Materials 2021, 33 (13), 5127-5136. https://doi.org/10.1021/acs.chemmater.1c01170.

Zeier, W. G.; Schlem, R.; Banik, A.; Eckardt, M.; Zobel, M. Na3—xEr1—xZrxCl6—A Halide-Based Fast Sodium-Ion Conductor with Vacancy-Driven Ionic Transport. ACS Appl Energy Mater 2020, 3 (10), 10164-10173. https://doi.org/10.1021/acsaem.0c01870.

Umeshbabu, E.; Maddukuri, S.; Hu, Y.; Fichtner, M.; Munnangi, A. R. Influence of Chloride Ion Substitution on Lithium-Ion Conductivity and Electrochemical Stability in a Dual-Halogen Solid-State Electrolyte. ACS Appl Mater Interfaces 2022, 14 (22), 25448-25456. https://doi.org/10.1021/acsami.2c04160.

Wang, J.; Chen, F.; Hu, L.; Ma, C. Alternate Crystal Structure Achieving Ionic Conductivity above 1 MS Cm-1 in Cost-Effective Zr-Based Chloride Solid Electrolytes. Nano Lett 2023, 23 (13), 6081-6087. https://doi.org/10.1021/acs.nanolett.3c01468.

Hu, L.; Wang, J.; Wang, K.; Gu, Z.; Xi, Z.; Li, H.; Chen, F.; Wang, Y.; Li, Z.; Ma, C. A Cost-Effective, Ionically Conductive and Compressible Oxychloride Solid-State Electrolyte for Stable All-Solid-State Lithium-Based Batteries. Nat Commun 2023, 14 (1). https://doi.org/10.1038/s41467-023-39522-1.

Li, B.; Li, Y.; Zhang, H. S.; Wu, T. T.; Guo, S.; Cao, A. M. Fast Li+-Conducting Zr4+-Based Oxychloride Electrolyte with Good Thermal and Solvent Stability. Sci China Mater 2023, 66 (8), 3123-3128. https://doi.org/10.1007/s40843-023-2434-4.

(Continued)

*Primary Examiner* — Haidung D Nguyen

(74) *Attorney, Agent, or Firm* — Thomas | Horstemeyer, LLP

(57) ABSTRACT

In accordance with the purpose(s) of the present disclosure, as embodied and broadly described herein, the disclosure, in one aspect, relates to sulfide solid electrolytes and synthesis of sulfide solid electrolytes. The electrolytes have the general formula $A_zM_wS_vCl_{4-y}X_y$ and exhibit good ionic conductivity. The electrolytes are relatively cost-effective to produce, as they contain naturally abundant elements, and can be synthesized via a relatively fast synthesis route. The electrolytes can be a component of different types of batteries or sensors for ion detection.

20 Claims, 10 Drawing Sheets

(56) References Cited

PUBLICATIONS

Kwak, H.; Han, D.; Lyoo, J.; Park, J.; Jung, S. H.; Han, Y.; Kwon, G.; Kim, H.; Hong, S. T.; Nam, K. W.; Jung, Y. S. New Cost-Effective Halide Solid Electrolytes for All-Solid-State Batteries: Mechanochemically Prepared Fe3+-Substituted Li2ZrCl6. Adv Energy Mater 2021, 11 (12). https://doi.org/10.1002/aenm.202003190.

Li, X.; Liang, J.; Yang, X.; Adair, K. R.; Wang, C.; Zhao, F.; Sun, X. Progress and Perspectives on Halide Lithium Conductors for All-Solid-State Lithium Batteries. Energy and Environmental Science. Royal Society of Chemistry 2020, pp. 1429-1461. https://doi.org/10.1039/c9ee03828k.

Park, K. H.; Kim, S. Y.; Jung, M.; Lee, S. Bin; Kim, M. J.; Yang, I. J.; Hwang, J. H.; Cho, W.; Chen, G.; Kim, K. S.; Yu, J. Anion Engineering for Stabilizing Li Interstitial Sites in Halide Solid Electrolytes for All-Solid-State Li Batteries. ACS Appl Mater Interfaces 2023. https://doi.org/10.1021/acsami.3c13002.

Kim, K.; Park, D.; Jung, H. G.; Chung, K. Y.; Shim, J. H.; Wood, B. C.; Yu, S. Material Design Strategy for Halide Solid Electrolytes Li3MX6(X=Cl, Br, and I) for All-Solid-State High-Voltage Li-Ion Batteries. Chemistry of Materials 2021, 33 (10), 3669-3677. https://doi.org/10.1021/acs.chemmater.1c00555.

Zhang, S.; Zhao, F.; Chen, J.; Fu, J.; Luo, J.; Alahakoon, S. H.; Chang, L. Y.; Feng, R.; Shakouri, M.; Liang, J.; Zhao, Y.; Li, X.; He, L.; Huang, Y.; Sham, T. K.; Sun, X. A Family of Oxychloride Amorphous Solid Electrolytes for Long-Cycling All-Solid-State Lithium Batteries. Nat Commun 2023, 14 (1). https://doi.org/10.1038/s41467-023-39197-8.

Wang, Q.; Zhou, Y.; Wang, X.; Guo, H.; Gong, S.; Yao, Z.; Wu, F.; Wang, J.; Ganapathy, S.; Bai, X.; Li, B.; Zhao, C.; Janek, J.; Wagemaker, M. Designing Lithium Halide Solid Electrolytes. Nat Commun 2024, 15 (1), 1050. https://doi.org/10.1038/s41467-024-45258-3.

* cited by examiner

SULFIDE ELECTROLYTES AND EFFICIENT METHODS FOR MAKING THE SAME

CROSS-REFERENCE TO RELATED APPLICATIONS

This application claims the benefit of and priority to co-pending U.S. Provisional Patent Application No. 63/640,424, filed on Apr. 30, 2024, the contents of which are incorporated by reference herein in their entireties.

STATEMENT REGARDING FEDERALLY SPONSORED RESEARCH OR DEVELOPMENT

This invention was made with Government support under contract DMR-1847038 awarded by the National Science Foundation. The Government has certain rights in the invention.

BACKGROUND

The burgeoning interest towards sustainable and renewable energy has engendered a need to develop fast-ion conducting solid electrolytes to cater for the ever-increasing demand for smart battery systems and all-solid-state batteries. Organic electrolyte-based commercial batteries that currently dominate the global market suffer from several limitations closely linked with safety issues; therefore, solid state electrolytes with improved mechanical and chemical stability, high energy density, wide electrochemical window, and electrochemical stability have been poised as the next-generation energy storage material.

Ideally, a solid-state electrolyte should possess low electronic conductivity, thermal stability, high ionic conductivity, and be economically feasible to produce. Halide solid electrolytes are one class of interest, as they are compatible with high-voltage cathode materials, have a wide electrochemical stability window, and can have relatively high Li-ion conductivity. However, high Li-ion conductivities in halide solid electrolytes have primarily been achieved by incorporating costly and rare elements such as Y, Er, Sc, and In. There is a need for solid electrolytes with good mechanical and electrochemical properties that are more economically feasible to produce and scale-up.

SUMMARY

In accordance with the purpose(s) of the present disclosure, as embodied and broadly described herein, the disclosure, in one aspect, relates to sulfide solid electrolytes and synthesis of sulfide solid electrolytes. The electrolytes have the general formula $A_zM_wS_vCl_{4-y}X_y$ and exhibit good ionic conductivity. The electrolytes are relatively cost-effective to produce, as they contain naturally abundant elements, and can be synthesized via a relatively fast synthesis route. The electrolytes can be a component of different types of batteries or sensors for ion detection.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 10A-1B show (a) the variable temperature $^7$Li static $T_1$ relaxation plot showing faster relaxation rates for $Li_2ZrSCl_{1.3}Br_{2.7}$ and (b) the linewidth narrowing of the $^7$Li static NMR spectra with increasing temperature, due to increased motion.

Figure 1A:
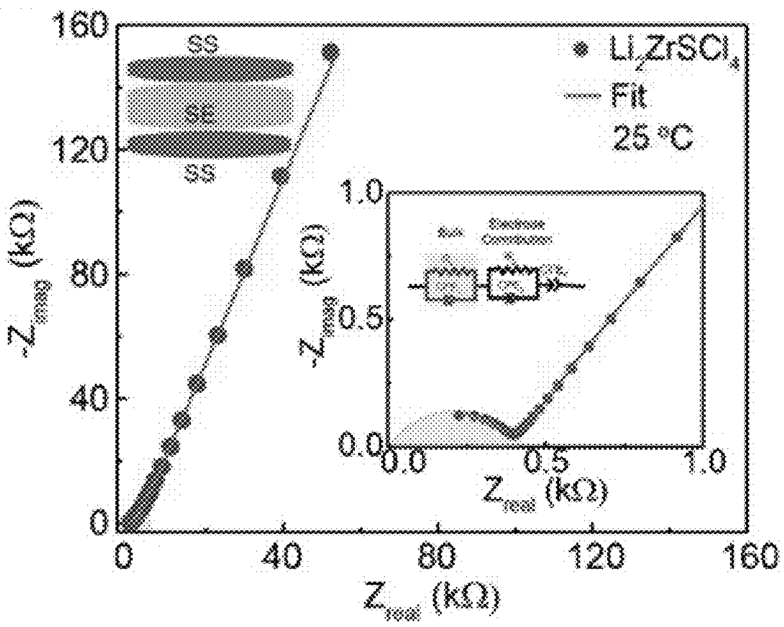
FIG. 1A shows a representative Nyquist plot and corresponding equivalent circuit fitting at 25° C. for $Li_2ZrSCl_4$ (LZSC).
Figure 1B:
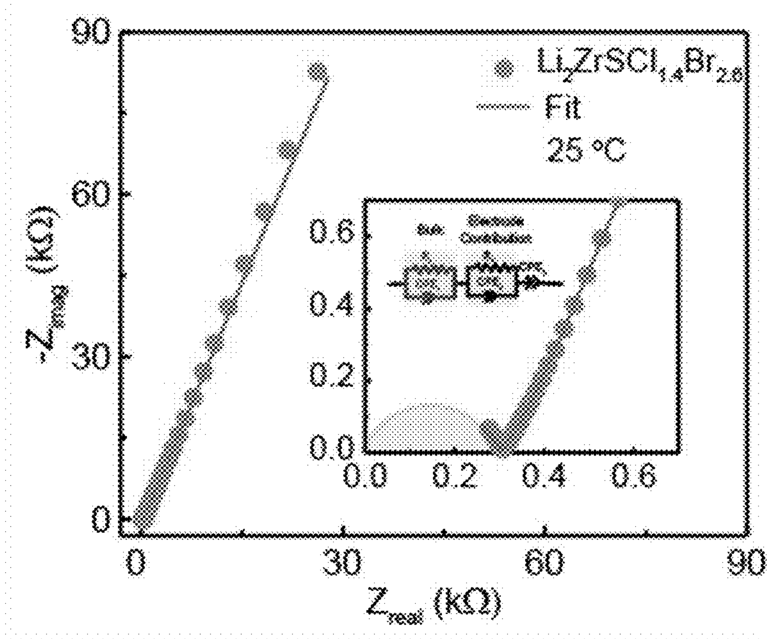
FIG. 1B shows a representative Nyquist plot and corresponding equivalent circuit fitting at 25° C. for $Li_2ZrSC_{1.4}Br_{2.6}$ (LZSCB).

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "an excipient" include, but are not limited to, mixtures or combinations of two or more such excipients, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y', where 'x' and 'y' are numerical values, includes "about 'x' to about 'y'.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range. Thus, for example, if a component is in an amount of about 1%, 2%, 3%, 4%, or 5%, where any value can be a lower and upper endpoint of a range, then any range is contemplated between 1% and 5% (e.g., 1% to 3%, 2% to 4%, etc.).

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

Sulfide Electrolytes and Methods of Making and Using the Same

The present disclosure, in one aspect, provides for solid electrolytes and the method of making and using solid electrolytes. The electrolytes or compounds disclosed herein have the general formula $A_zM_wS_vCl_{4-y}X_y$ and have good ionic conductivities. The electrolytes can be produced using inexpensive materials and a relatively rapid synthesis process, making them viable for production scale-up and commercialization. The electrolytes can also be characterized by a softness or deformability that can benefit conformal contact with electrode interfaces, improving the mechanical stability of devices comprising the electrolytes and enhancing ion transport efficiency. The electrolytes can be a component of different types of batteries, such as solid-state batteries, or sensor for ion detection, such as ion-selective electrodes.

In one aspect, the electrolytes or compounds disclosed herein have the formula $A_zM_wS_vCl_{4-y}X_y$, where A is Li, Na, K, or any combination thereof; M is Zr, Hf, or a combination thereof; X is Br, I, or a combination thereof; z is greater than zero to about 4.0; v is greater than zero to about 2.0; y is greater than or equal to zero to about 4.0; and the sum (z+4w−2v) is equal to 4.

In one aspect, z can be from about 0.01 to about 4.0, or about 0.01, 0.1, 0.25, 0.5, 0.75, 1.0, 1.25, 1.5, 1.75, 2.0, 2.25, 2.5, 2.75, 3.0, 3.25, 3.5, 3.75, or 4.0, where any value can be a lower and upper endpoint of a range (e.g., 1.0 to 2.0).

In another aspect, w can be greater than zero to about 2.0, or about 0.01, 0.1, 0.25, 0.5, 0.75, 1.0, 1.25, 1.5, 1.75, or 2.0, where any value can be a lower and upper endpoint of a range (e.g., 0.1 to 2.0).

In another aspect, v can be from about 0.01 to about 2.0, or about 0.01, 0.1, 0.25, 0.5, 0.75, 1.0, 1.25, 1.5, 1.75, or 2.0, where any value can be a lower and upper endpoint of a range (e.g., 0.1 to 2.0).

For any formula of electrolyte or compound disclosed herein, y can be from about 0.01, 0.1, 0.25, 0.5, 0.75, 1.0, 1.25, 1.5, 1.75, 2.0, 2.25, 2.5, 2.75, 3.0, 3.25, 3.5, 3.75, or 4.0, where any value can be a lower and upper endpoint of a range (e.g., 1.0 to 3.0). In another aspect, y is zero. In a further aspect, the compound or electrolyte is $Li_zZrSCl_{4-y}Br_y$, preferably $Li_2ZrSCl_{4-y}Br_y$, where y is 2.0, 2.1, 2.2, 2.3, 2.4, 2.5, 2.6, 2.7, 2.8, 2.9, or 3.0, where any value can be a lower and upper endpoint of a range (e.g., 2.5 to 2.9). In another aspect, the compound or electrolyte is $Li_2ZrSCl_4$, $Li_2ZrSC_{1.4}Br_{2.6}$, or $Li_2ZrSCl_{1.3}Br_{2.7}$.

The electrolytes disclosed herein have several desirable properties. In one aspect, the electrolytes can have good ionic conductivity. The electrolytes can have an ionic conductivity of at least about 0.30 mS/cm, at least about 0.50 mS/cm, or at least about 0.70 mS/cm. In another aspect, the ionic conductivity of the electrolytes can be from about 0.30 mS/cm to about 3.00 mS/cm, or about 0.30 mS/cm, 0.50 mS/cm, 0.70 mS/cm, 0.90 mS/cm, 1.00 mS/cm, 1.50 mS/cm, 2.00 mS/cm, 2.50 mS/cm, or 3.00 mS/cm, where any value can be a lower and upper endpoint of a range (e.g., 0.30 mS/cm to 1.00 mS/cm). In one aspect, the electrolytes remain conductive over a temperature range of about −20° C. to about 80° C., or about −20° C., −10° C., 0° C., 10° C., 20° C., 30° C., 40° C., 50° C., 60° C., 70° C., or 80° C., where any value can be a lower and upper endpoint of a range (e.g., −20° C. to 80° C.). Methods for determining ionic conductivity are provided in the Examples.

In one aspect, the electrolytes disclosed herein can have low electronic conductivities. The electrolytes can have an electronic conductivity of less than about $1.00\times10^{-8}$ S/cm, less than about $5.00\times10^{-9}$ S/cm, or less than about $1.00\times10^{-9}$ S/cm. In another aspect, the electrolytes can have an electronic conductivity of from about $1.00\times10^{-8}$ S/cm to about $1.00\times10^{-11}$ S/cm, or about $1.00\times10^{-8}$ S/cm, $5.00\times10^{-9}$ S/cm, $1.00\times10^{-9}$ S/cm, $5.00\times10^{-10}$ S/cm, $1.00\times10^{-10}$ S/cm, $5.00\times10^{-11}$ S/cm, or $1.00\times10^{-11}$ S/cm, where any value can be a lower and upper endpoint of a range (e.g., $1.00\times10^{-9}$ S/cm to $1.00\times10^{-11}$ S/cm). Methods for determining electronic conductivity are provided in the Examples.

In another aspect, the electrolytes disclosed herein can have relatively low activation energy barriers to ion transport. The electrolytes can have an activation energy of from about 0.1 eV to about 0.6 eV, or about 0.1 eV, 0.2 eV, 0.3 eV, 0.4 eV, 0.5 eV or 0.6 eV, where any value can be a lower and upper endpoint of a range (e.g., 0.3 eV to 0.4 eV).

The compounds or electrolytes can be cost-effective to produce due at least in part to the use of naturally abundant elements to synthesize them. One measurement of an element's abundance is the element's Earth crust abundance, or an estimate of the amount of the element present in the Earth's upper continental crust. In one aspect, at least one element or at least two elements present in the compound have an Earth crust abundance of at least 150 mg/kg (mg of element per kg crust). In a further aspect, one or two elements present in the compound have an Earth crust abundance of at least 150 mg/kg. In another aspect, at least one element or only one element present in the compound has an Earth crust abundance of from 150 mg/kg to about 200 mg/kg. In another aspect, at least two elements or only two elements present in the compound have an Earth crust abundance of from 150 mg/kg to about 500 mg/kg.

In one aspect, the electrolytes or compounds disclosed herein are disordered with a glassy or amorphous structure.

Additionally, the electrolytes described herein possess unique solid-state NMR spectra. In one aspect, the Li-containing electrolytes can have peaks at about −0.68 ppm, −0.55 ppm, −0.54 ppm, and 2.4 ppm as determined by $^6Li$ solid-state NMR spectroscopy. Exemplary methods for performing NMR measurements are provided in the Examples.

Also disclosed is a method for making sulfide electrolytes having the formula $A_zM_wS_vCl_{4-y}X_y$, where A is Li, Na, K, or any combination thereof; M is Zr, Hf, or a combination thereof; X is Br, I, or a combination thereof; z is greater than zero to about 4.0; v is greater than zero to about 2.0; y is greater than or equal to zero to about 4.0; and the sum (z+4w−2v) is equal to 4. The method includes combining a plurality of precursor compounds, such as a salt, in various amounts in the solid state and mixing them together by mechanochemical milling. In one aspect, the precursor compounds are mixed together in stoichiometric amounts. The precursor compounds mixed together can include $A_2S$, $MCl_4$, $MX_4$, and any combination thereof, to produce a precursor mixture. In a further aspect, the precursor compounds mixed together can include $A_2S$, selected from the group of $Li_2S$, $Na_2S$, $K_2S$, and any combination thereof; $MCl_4$, selected from the group of $ZrCl_4$, $HfCl_4$, and a combination thereof; and $MX_4$, selected from the group of $ZrBr_4$, $ZrI_4$, $HfBr_4$, $HfI_4$, and any combination thereof. The components of the precursor mixture can be hand-ground before mechanochemical milling to form a homogenous precursor mixture. In another aspect, forming the precursor mixture and/or forming the homogenous precursor mixture can be performed in an inert atmosphere, such as an argon or nitrogen atmosphere, with an $O_2$ content of less than 20 ppm, less than 10 ppm, less than 1 ppm, less than 0.5 ppm, or less than 0.1 ppm.

The compounds used to produce the electrolytes described herein are generally highly pure materials. In one aspect, each of the compounds has a purity of greater than 99%, greater than 99.5%, or greater than 99.9%. In one aspect, each compound used to produce the electrolytes are substantially anhydrous, where each compound is at least 95% moisture free, at least 98% moisture free, at least 99% moisture free, at least 99.9% moisture free, or 100% moisture free. In another aspect, each compound has less than 0.5 ppm water, less than 0.25 ppm water, or less than 0.1 ppm water.

The precursor compounds can be mixed by mechanochemical milling. Mixing of the precursor compounds can occur in a mixing jar or container using one or more balls to produce a complex motion that combines back-and-forth swings with short lateral movements. In one aspect, the precursor compounds are mixed with one another for less than seven hours, less than 5 hours, or less than 3 hours. In another aspect, the compounds are mixed from about 1 hour to about 5 hours or about 1 hour, 2 hours, 3 hours, 4 hours, or 5 hours, where any value can be a lower and upper endpoint of a range (e.g., 1 hour to 4 hours). In one aspect, the precursor compounds are mixed in an inert atmosphere such as, for example, nitrogen or argon. In one aspect, the inert atmosphere has less than 20 ppm oxygen, less than 10 ppm oxygen, less than 1 ppm oxygen, less than 0.5 ppm oxygen, less than 0.25 ppm oxygen, or less than 0.1 ppm oxygen. In one aspect, the mixture is further dried after mixing. After mixing, the mixture can be pelletized. The pellets can be formed by pressing the mechanochemically milled mixture into a mold.

The compounds disclosed herein can be components of different types of batteries, such as solid-state batteries. The component of the battery including the compounds can be an electrolyte, a separator membrane, or a combination thereof. A separator membrane can be placed between the anode and the cathode of a battery. The separator membrane can be a porous membrane with an electrolyte dispersed within it, such as any one of the sulfide electrolytes disclosed herein. In one aspect, the separator membrane can function as both the separator between the electrodes and as the electrolyte. The compounds disclosed herein can also be components of different types of sensors, such as ion-selective electrodes, that are configured for ion detection (e.g., $Li^+$ detection).

Sensors can be used, for example, to measure or detect metal contamination in water sources or biofluids. An ion-selective electrode can comprise a substrate, an alkali-metal layer, such as a layer comprising any of the sulfide electrolytes or compounds disclosed herein, deposited onto the substrate, and an ion sensitive membrane, comprising a material such as poly(vinyl chloride).

Aspects

Aspect 1. A compound having the formula $A_zM_wS_vCl_{4-y}X_y$, wherein A is Li, Na, K, or any combination thereof; M is Zr, Hf, or a combination thereof; X is Br, I, or a combination thereof; z is greater than zero to about 4.0; v is greater than zero to about 2.0; y is greater than or equal to zero to about 4.0; and the sum (z+4w−2v) is equal to 4.

Aspect 2. The compound of aspect 1, wherein A is Li.

Aspect 3. The compound of aspect 1, wherein A is Na.

Aspect 4. The compound of any one of aspects 1-3, wherein z is greater than zero to about 2.0.

Aspect 5. The compound of any one of aspects 1-3, wherein z is about 1.0 to about 2.0.

Aspect 6. The compound of any one of aspects 1-5, wherein M is Zr.

Aspect 7. The compound of any one of aspects 1-6, wherein w is greater than zero to about 2.0.

Aspect 8. The compound of any one of aspects 1-6, wherein w is from about 0.1 to about 1.0.

Aspect 9. The compound of any one of aspects 1-8, wherein v is from about 0.01 to about 2.0.

Aspect 10. The compound of any one of aspects 1-8, wherein v is from about 0.1 to about 1.0.

Aspect 11. The compound of any one of aspects 1-10, wherein X is Br.

Aspect 12. The compound of any one of aspects 1-11, wherein y is from about 0.1 to about 4.0.

Aspect 13. The compound of any one of aspects 1-11, wherein y is from about 1.0 to about 3.0.

Aspect 14. The compound of any one of aspects 1-11, wherein y is zero.

Aspect 15. The compound of aspect 1, wherein the compound is $Li_zZrSCl_{4-y}Br_y$ or $Li_2ZrSCl_{4-y}Br_y$, Aspect 16. The compound of aspect 15, wherein y is zero.

Aspect 17. The compound of aspect 15, wherein y is from about 0.1 to about 4.0.

Aspect 18. The compound of aspect 15, wherein y is from about 1.0 to about 3.0.

Aspect 19. The compound of aspect 1, wherein the compound is $Li_2ZrSCl_4$, $Li_2ZrSCl_{1.4}Br_{2.6}$, or $Li_2ZrSCl_{1.3}Br_{2.7}$.

Aspect 20. The compound of any one of aspects 1-19, wherein the compound has an ionic conductivity of at least about 0.30 mS/cm.

Aspect 21. The compound of any one of aspects 1-19, wherein the compound has an ionic conductivity of about 0.30 mS/cm to about 3.00 mS/cm.

Aspect 22. The compound of any one of aspects 1-21, wherein the compound has an electronic conductivity of less than about $1.00\times10^{-8}$ S/cm.

Aspect 23. The compound of any one of aspects 1-21, wherein the compound has an electronic conductivity of about $1.00\times10^{-8}$ S/cm to about $1.00\times10^{-11}$ S/cm.

Aspect 24. The compound of any one of aspects 1-23, wherein the compound is conductive over a temperature range of about −20° C. to about 80° C.

Aspect 25. The compound of any one of aspects 1-24, wherein the compound has an activation energy for ion transport of from about 0.1 eV to about 0.6 eV.

Aspect 26. The compound of any one of aspects 1-24, wherein the compound has an activation energy for ion transport of from about 0.2 eV to about 0.4 eV.

Aspect 27. The compound of any one of aspects 1-26, wherein at least one element present in the compound has an Earth crust abundance of at least 150 mg/kg.

Aspect 28. The compound of any one of aspects 1-26, wherein at least one element present in the compound has an Earth crust abundance of from about 150 mg/kg to about 200 mg/kg.

Aspect 29. The compound of any one of aspects 1-26, wherein at least two elements present in the compound have an Earth crust abundance of at least 150 mg/kg.

Aspect 30. The compound of any one of aspects 1-26, wherein at least two elements present in the compound have an Earth crust abundance of from about 150 mg/kg to about 500 mg/kg.

Aspect 31. The compound of any one of aspects 1-30, wherein the compound is amorphous.

Aspect 32. The compound of any one of aspects 1-31, wherein the compound has peaks at about −0.68 ppm, −0.54 ppm, and 2.4 ppm, as determined by $^{6}Li$ solid-state NMR spectroscopy.

Aspect 33. A method for making a compound having the formula $A_zM_wS_vCl_{4-y}X_y$, wherein A is Li, Na, K, or any combination thereof; M is Zr, Hf, or a combination thereof; X is Br, I, or a combination thereof; z is greater than zero to about 4.0; v is greater than zero to about 2.0; y is greater than or equal to zero to about 4.0; and the sum (z+4w−2v) is equal to 4; the method comprising: (a) combining in the solid state the following components (i) $A_2S$ selected from the group consisting of $Li_2S$, $Na_2S$, $K_2S$, and any combination thereof; (ii) $MCl_4$ selected from the group consisting of $ZrCl_4$, $HfCl_4$, and a combination thereof; and (iii) $MX_4$ selected from the group consisting of $ZrBr_4$, $ZrI_4$, $HfBr_4$, $HfI_4$, and any combination thereof, to produce a precursor mixture; and (b) mixing the precursor mixture by mechanochemical milling.

Aspect 34. The method of aspect 33, wherein precursor mixture is mixed by mechanochemical milling for about 1 hour to about 4 hours.

Aspect 35. The method of aspect 33, wherein precursor mixture is mixed by mechanochemical milling for about 2 hours.

Aspect 36. The method of any one of aspects 33-35, wherein the components are substantially anhydrous.

Aspect 37. The method of any one of aspects 33-36, wherein the components are mixed in an inert atmosphere.

Aspect 38. The method of any one of aspects 33-37, wherein the components are combined in stoichiometric amounts.

Aspect 39. A compound produced by the method of any one of aspects 33-38.

Aspect 40. An article comprising the compound in any one of aspects 1-32 and 39.

Aspect 41. The article of aspect 40, wherein the article is a battery or a component of a battery.

Aspect 42. The article of aspect 41, wherein the battery is a solid-state battery.

Aspect 43. The article of aspect 41 or 42, wherein the component of the battery is an electrolyte, a separator membrane, or a combination thereof.

Aspect 44. A sensor for ion detection, comprising the compound in any one of aspects 1-32 and 39.

Aspect 45. The sensor of aspect 44, wherein the ion comprises lithium ion.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Examples

The following examples are put forth so as to provide those of ordinary skill in the art with a complete disclosure and description of how the compounds, compositions, articles, devices and/or methods claimed herein are made and evaluated and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure.

Materials and Methods

Synthesis

Lithium sulfide (99.5%, Alfa Aesar), $ZrCl_4$ (99.9%, Alfa Aesar), and ZrBr4 (99.9%, Alfa Aesar) were stored in an argon-filled glovebox (VTI) with moisture and $O_2$ levels below 0.1 ppm each to prevent exposure to moisture and ambient conditions. Subsequently, a stoichiometric amount of the precursors was manually ground to achieve a homogeneous powder. The homogenous mixture was then transferred into a 20 mL zirconia milling jar, with three 10 mm-sized zirconia balls, and vacuum sealed within the argon-filled glovebox. Mechanochemical milling was done using the 8000M Mixer/Mill® High-Energy Ball Mill for 2 hours. The processed sample was thereafter stored in the argon-filled glovebox for further characterization.

Characterization

Powder X-ray Diffraction—The prepared sample was sealed on a zero-background sample holder with Kapton film. The sample was analyzed in a Rigaku SmartLab X-ray diffractometer with a Cu source. A wavelength of 0.154 nm and a range of 2θ values from 10° to 70° were used.

Electrochemical Impedance Spectroscopy (EIS)—For impedance measurements, the sample was hand-ground and pressed in an 8 mm diameter mold to make a ~0.9 mm thick pellet. The pellet was assembled in a split cell with steel as the blocking electrode. The measurement of potentiostatic EIS was carried out using a Gamry electrochemical analyzer and conductivities were calculated from the resulting Nyquist plots. Variable temperature EIS characterization was performed from −20° C. to 60° C. to calculate the activation energy via Arrhenius plots. Electronic conductivity was measured using the DC polarization method. Equilibrium currents were monitored at different voltages.

Results and Discussion

Electrochemical impedance spectroscopy (EIS) was employed to determine the ionic conductivity of $Li_2ZrSCl_4$ through a symmetric Li ion blocking setup, Stainless steel (SS)|LZSC| Stainless steel (SS) depicted in FIG. 1A.

The synthesized $Li_2ZrSCl_4$ (LZSC) and $Li_2ZrSCl_{1.4}Br_{2.6}$ (LZSCB) exhibit a room-temperature superionic conductivity of ~0.45 and ~0.66 mS/cm, respectively. One reason for the increase in ionic conductivity with Br substitution could be the larger structural volume created by the higher radii element for improved Li-ion transport. The impedance spectra of LZSC are composed of a single suppressed semicircle at high frequency and a sloped line at low frequency.

Figure 4:
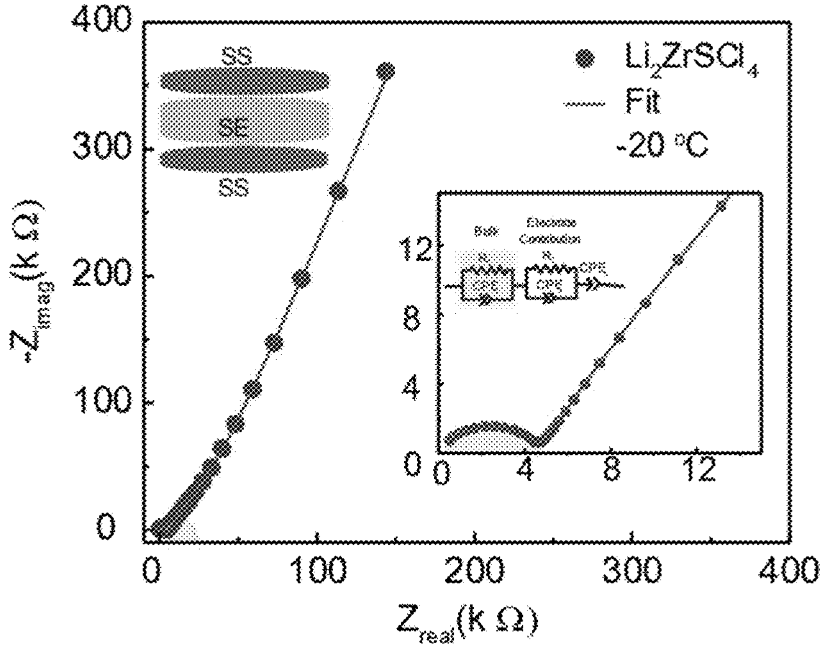
FIG. 4 shows a representative Nyquist plot and corresponding equivalent circuit fitting at 25° C. for $Li_2ZrSCl_4$.
Figure 5:
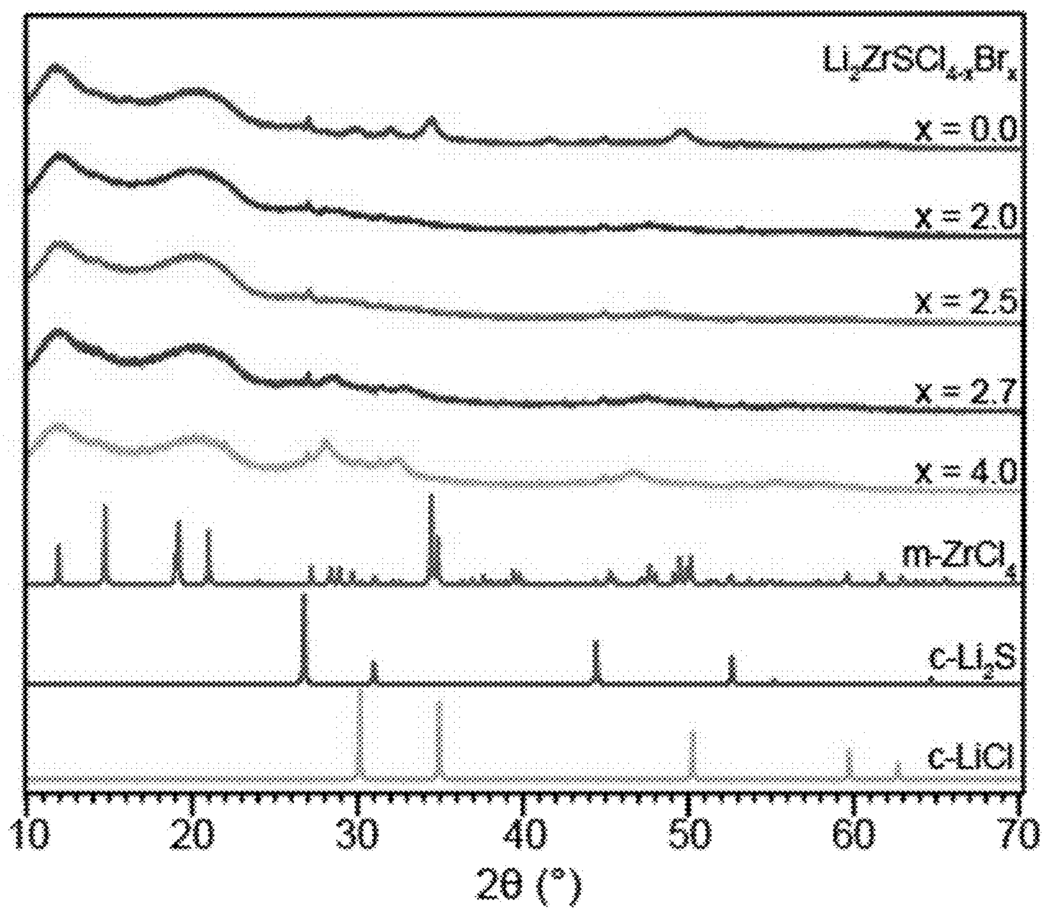
FIG. 5 shows lab X-ray diffraction of $Li_2ZrSCl_{4-x}Br_x$. The absence of major Bragg peaks in the LZSCB series indicates a predominately amorphous material.
Figure 6:
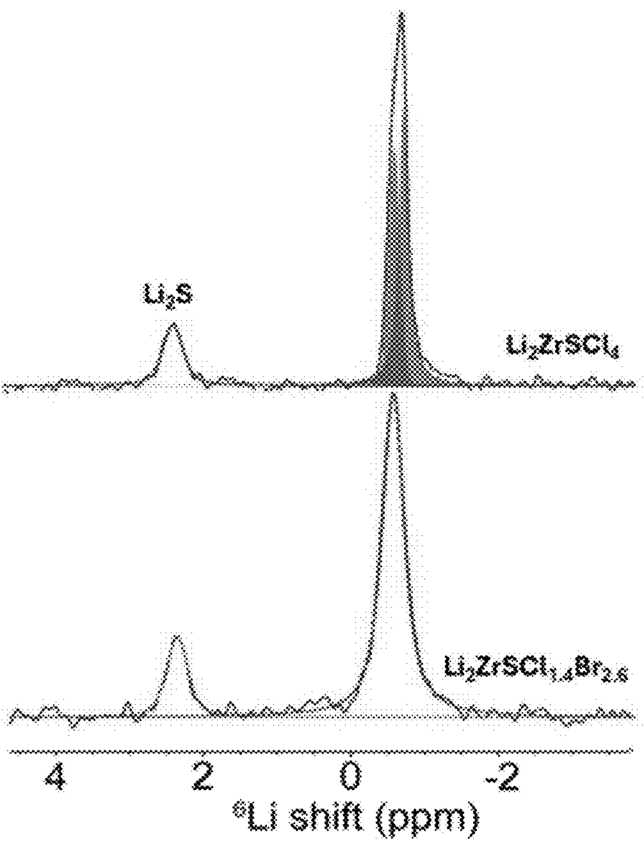
FIG. 6 shows $^6$Li NMR spectra of $Li_2ZrSCl_{4-x}Br_x$ (x=0 and 2.6). A homogenized Li local environment (−0.54 ppm) fostering rapid motion is observed for LZSCB.
Figure 7A:
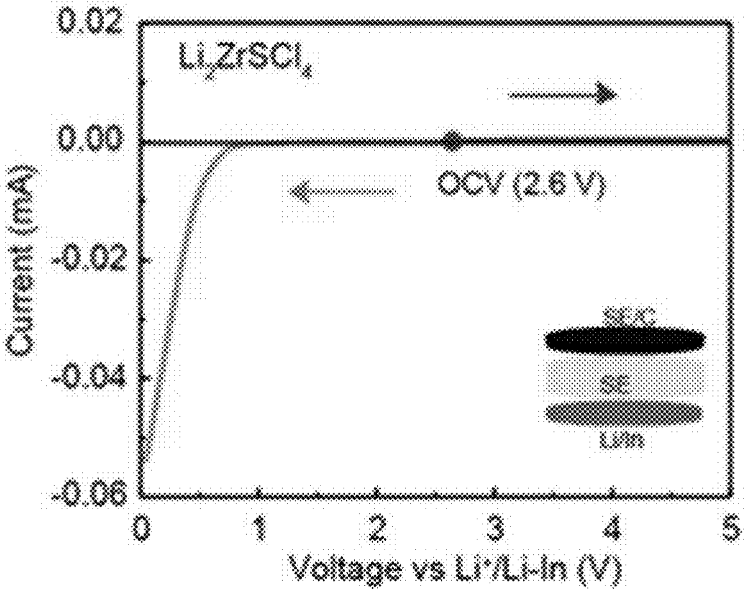
FIGS. 7A-7B show linear sweep voltammetry curves for evaluating the electrochemical stability window of $Li_2ZrSCl_{4-x}Br_x$, x=0 (7A) and 2.6 (7B). LZSC exhibits a remarkably high electrochemical window. This suggests high oxidative stability with >5v cathodes.
Figure 7B:
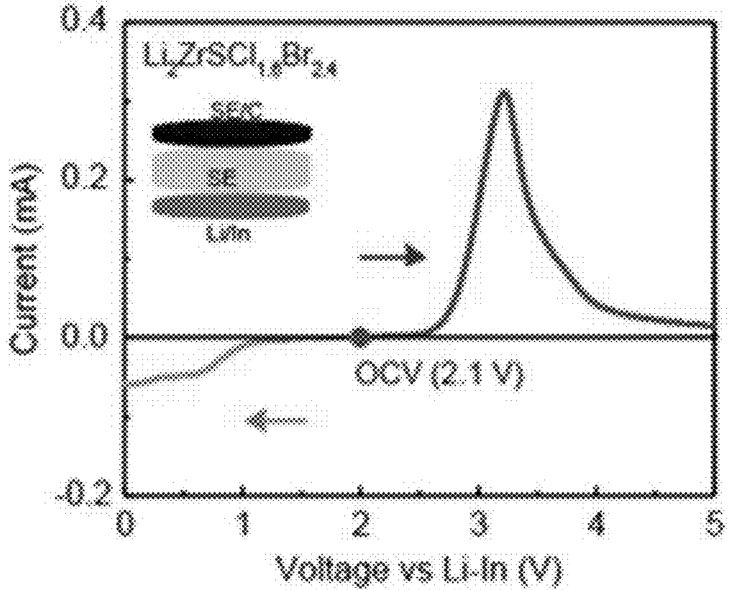

The data has been modeled with the two (RQ)+Q equivalent circuit models to quantitatively understand these processes and their contributions to the impedance in LZSC. A resistor (R) connected in parallel to a constant phase element (Q) is represented by the symbol (RQ). A constant phase element was employed instead of a capacitor to account for heterogeneous surfaces between the steel electrode contacts and the pellet. The low-frequency tail is in line with capacitive build-up at steel-blocking electrodes. The high-frequency (RQ) semicircle can be attributed to a combination of bulk and grain-boundary impedances, as in other Li-ion conducting halide solid electrolytes. The incomplete (RQ) semicircle, which implies several overlapping processes at high frequencies, provides evidence for this. A low temperature of −20° C. was selected (FIG. 4) to differentiate between the contributions of the bulk ($R_b$) and grain-boundary ($R_{gb}$) to the total resistivity ($R_t$). The capacitance values extracted from the equivalent circuit fitting for LZSC is $3.96\times10^{-11}$ F. Even at very low temperatures, such as −20° C., it can be inferred that bulk and grain boundary contributions cannot be reasonably deconvoluted. Therefore, the conductivities described here indicate total conductivities. A capacitance value of $2.87\times10^{-7}$ F was extracted for the mid-frequency semicircle, which implies it's due to the electrode contribution.[11-13]

To investigate the solid electrolytes' transport properties under different temperature ranges, temperature-dependent impedance spectroscopy experiments were conducted.

Figure 1C:
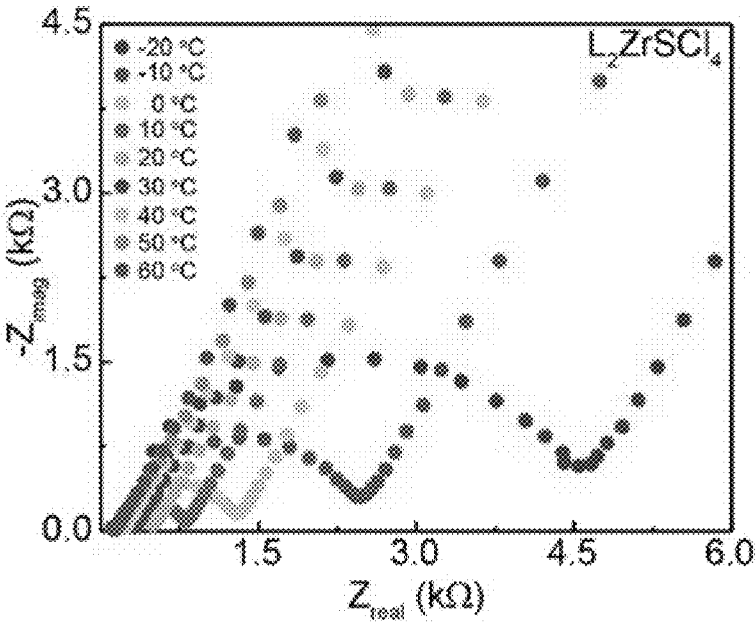
FIG. 1C shows variable-temperature Nyquist plots obtained for $Li_2ZrSCl_4$.
Figure 1D:
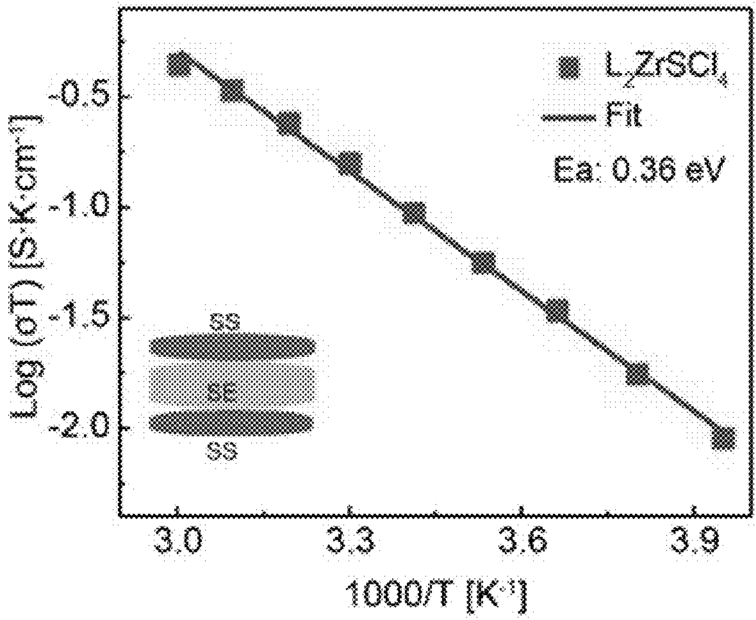
FIG. 1D shows an Arrhenius-type plot of $Li_2ZrSCl_4$.

Representative Nyquist plots of the LZSC composition in the −20° C. to 60° C. temperature range are shown in FIG. 1C. The activation energy (Ea) of halide electrolytes was determined using the Arrhenius equation, as displayed in FIG. 1D. LZSC displayed a relatively low activation energy of 0.36 eV. It should be noted that the entire Arrhenius plot shows an almost linear variation, indicating that phase transitions or degradations do not occur in this temperature range.[14]

Figure 2A:
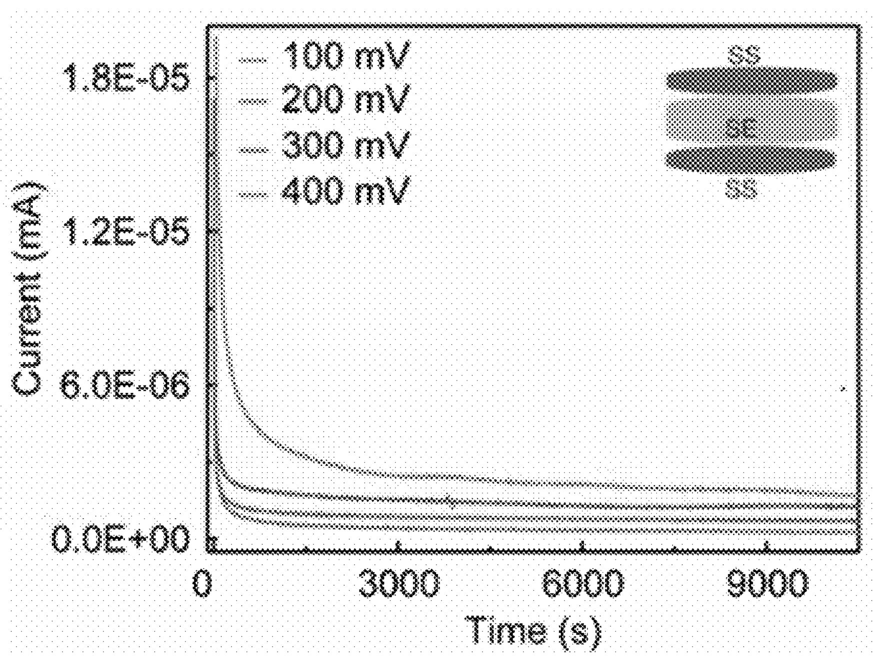
FIG. 2A shows DC-Polarization on a symmetric SS|LZSC|SS cell (SS: stainless steel) to determine $\sigma_{el}$.
Figure 2B:
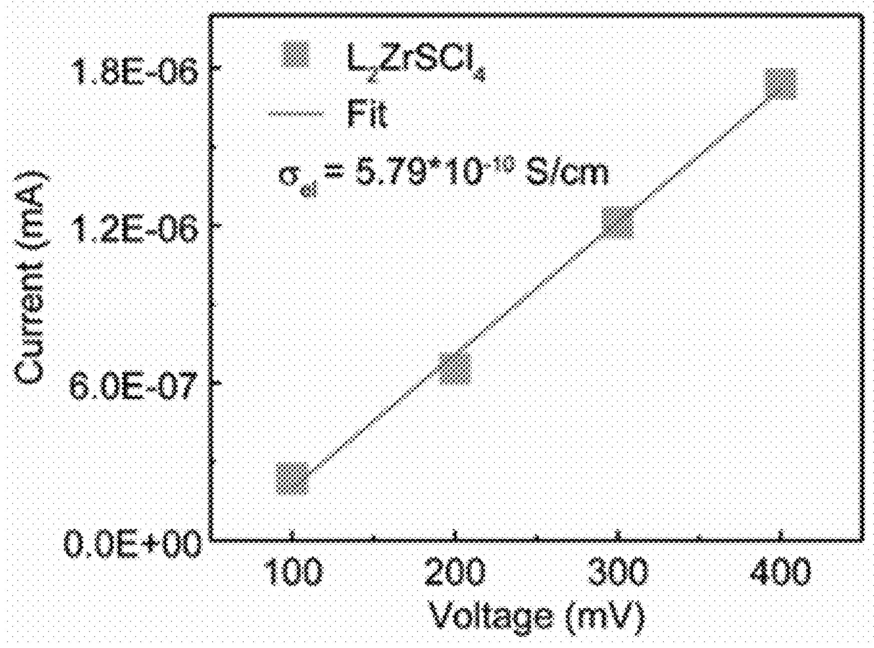
FIG. 2B shows current vs. voltage curves of the LZSC under different DC voltages with the linear fit. The electric resistances were calculated based on Ohm's law. The conductivity values were calculated by considering the sample's geometric dimensions.
Figure 3:
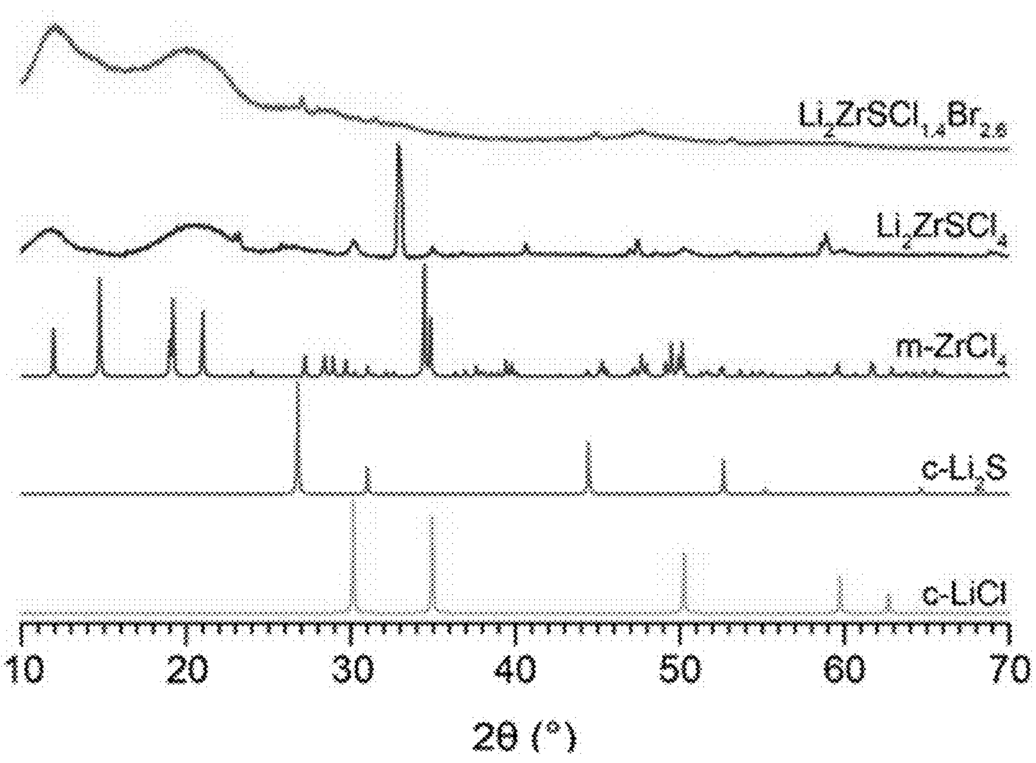
FIG. 3 shows lab X-ray diffraction of LZSC and LZSCB.

The DC polarization technique, represented in FIGS. 2A-2B, was applied to the samples in a symmetric setup SS|LZSC|SS for the experimental investigation of electronic contribution ($\sigma_{el}$) to the total conductivity. Equilibrium currents were monitored at different voltages to increase the accuracy of DC polarization measurements. Then, using Ohm's rule (V=IR), the respective partial conductivities can be determined from the voltage vs. current plot.[15] The electronic conductivity of LZSC is $5.80\times10^{-10}$ $Scm^{-1}$ which is negligible compared to the corresponding ionic conductivity. This helps to prevent internal short circuits.

A predominantly glassy phase is evident for LZSC and the Br-doped LZSCB, characterized by the broad peaks. The few peaks in LZSCB are almost absorbed in the background, hinting at a highly disordered/amorphous material. An unusually sharp peak can be observed at ~33° for LZSC in this initial diffraction experiment. This is hypothesized as an impurity phase as it is absent in LZSCB. Matching the peaks to the diffraction patterns of the starting material shows that some of the tiny peaks observed for LZSCB are likely trace amounts of $Li_2S$ impurities. The XRD confirms that this is a glassy material.

An additional compound described herein ($Li_2ZrSCl_{1.3}Br_{2.7}$) was further evaluated.

Figure 8:
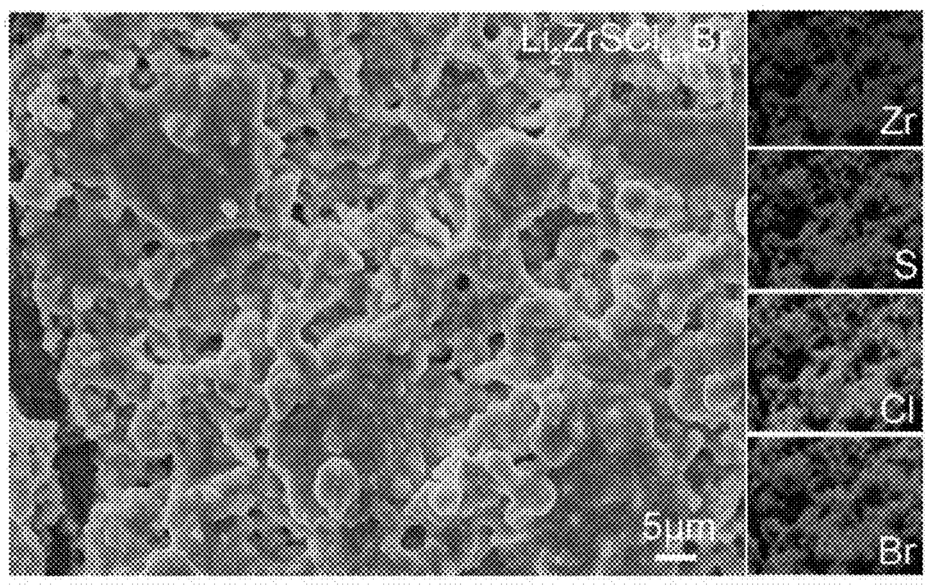
FIG. 8 shows the SEM/EDS image for $Li_2ZrSCl_{1.3}Br_{2.7}$.

FIG. 8 shows the SEM/EDS image for $Li_2ZrSCl_{1.3}Br_{2.7}$. Referring to FIG. 8, $Li_2ZrSCl_{1.3}Br_{2.7}$ is a homogeneous cluster of particles and smooth surface morphology, consistent with the amorphous nature observed in XRD. The material showed no signs of crystalline domains or phase separations, indicating uniformity in composition and structure. EDS analysis corroborated the elemental composition, revealing a uniform distribution of constituent elements across the sample. The elemental mapping confirmed the presence of key components —Zr, S, Cl, and Br, which is important for electrolyte functionality.

Figure 9:
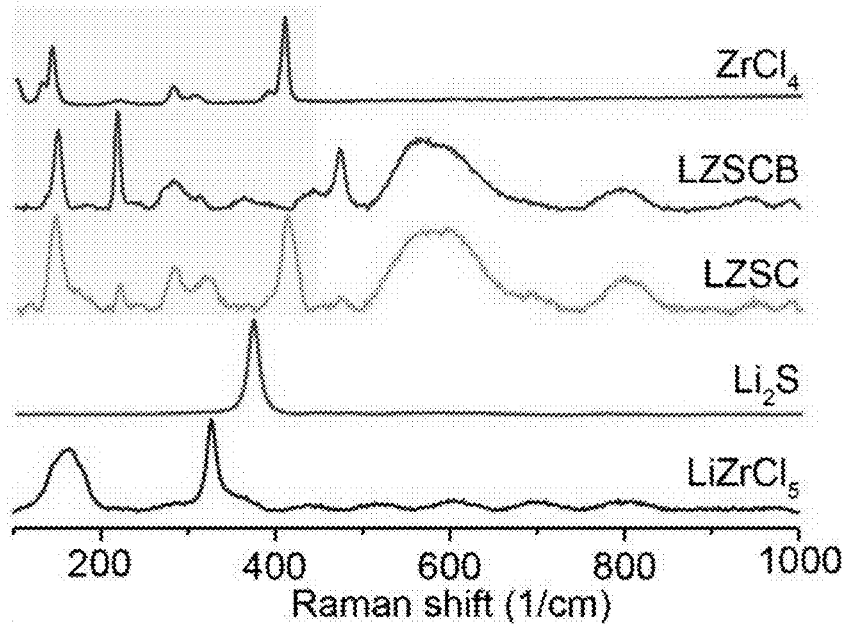
FIG. 9 shows the Raman spectra of $Li_2ZrSCl_4$ and $Li_2ZrSCl_{1.3}Br_{2.7}$ compared to related structures.

FIG. 9 shows the Raman spectra of $Li_2ZrSCl_4$ (LZSC) and $Li_2ZrSC_{1.3}Br_{2.7}$ (LZSCB) compared to related structures. $Li_2ZrSCl_{1.3}Br_{2.7}$ exhibits a complex Raman signature that blends features from $Li_2S$, $ZrCl_4$, and $LiZrCl_5$. The broad peaks suggest a degree of disorder, which could be beneficial for Li-ion mobility in solid-state electrolytes. The inclusion of bromine likely alters the lattice dynamics, leading to subtle shifts compared to LZSC. The disappearance of the $Li_2S$ peaks indicate successful incorporation of $S^{2-}$ into the base Zr coordinated structure.

Figures 10A, 10B:
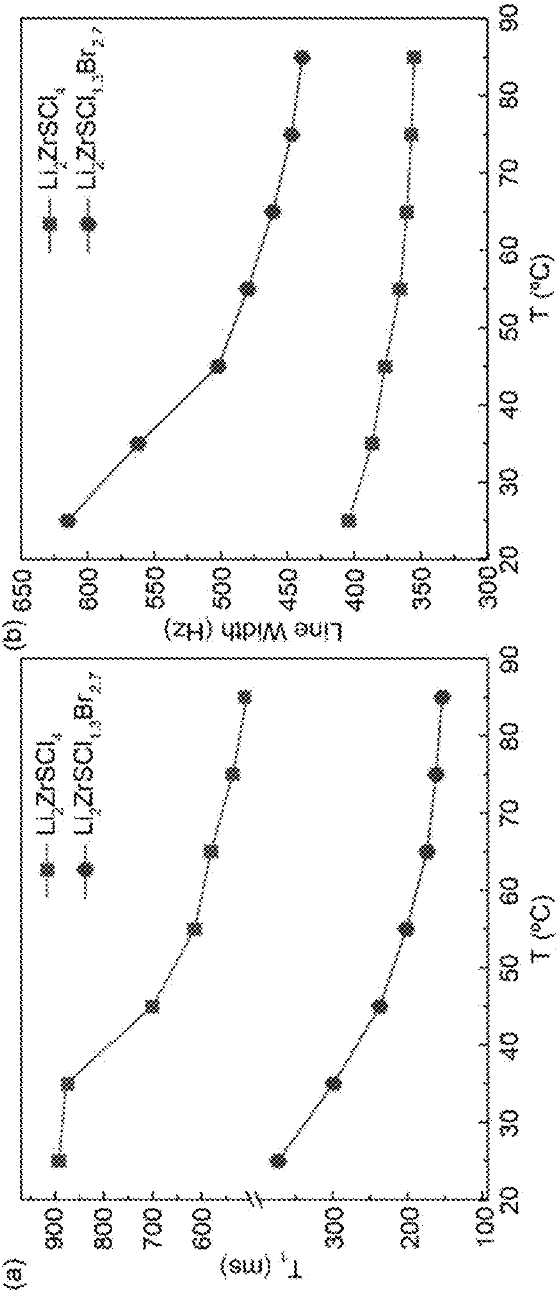

The solid electrolyte's $^7Li$ spin-lattice relaxation time (T1) measurements were conducted over a 25 to 85° C. temperature range using the inversion recovery method under static conditions (FIG. 10A). Overall, the electrolyte with a higher ionic conductivity, $Li_2ZrSC_{1.3}Br_{2.7}$, displays shorter $T_1$ values than $Li_2ZrSCl_4$. This indicates that $Li_2ZrSC_{1.3}Br_{2.7}$ has more dynamic molecular motions, which enhances the spin-lattice relaxation process. The observed $T_1$ values exhibit clear temperature dependence, decreasing progressively with increasing temperature. This behavior aligns with the predictions of the Bloembergen-Purcell-Pound (BPP) theory, specifically within the slow/intermediate motion regime. According to BPP theory, in the slow-motion region, as the temperature rises, the molecular dynamics of the system increase, leading to a more efficient, relaxation process and thus shorter $T_1$ times. This is due to the correlation time ($T_c$) of the molecular motions approaching the Larmor frequency ($\omega_o$), where $\omega_o T_c >> 1$, facilitating energy transfer from the spins to the lattice.

The $^7Li$ NMR spectra of the solid electrolyte show significant line narrowing with increasing temperature (FIG. 10B). This phenomenon is consistent with motional narrowing, where increased ionic mobility reduces local magnetic field inhomogeneities experienced by the lithium nuclei, and the dynamic averaging of the $^7Li$-$^7Li$ dipolar couplings, resulting in the observed spectral shrinkage.

Figures 11A, 11B, 11C:
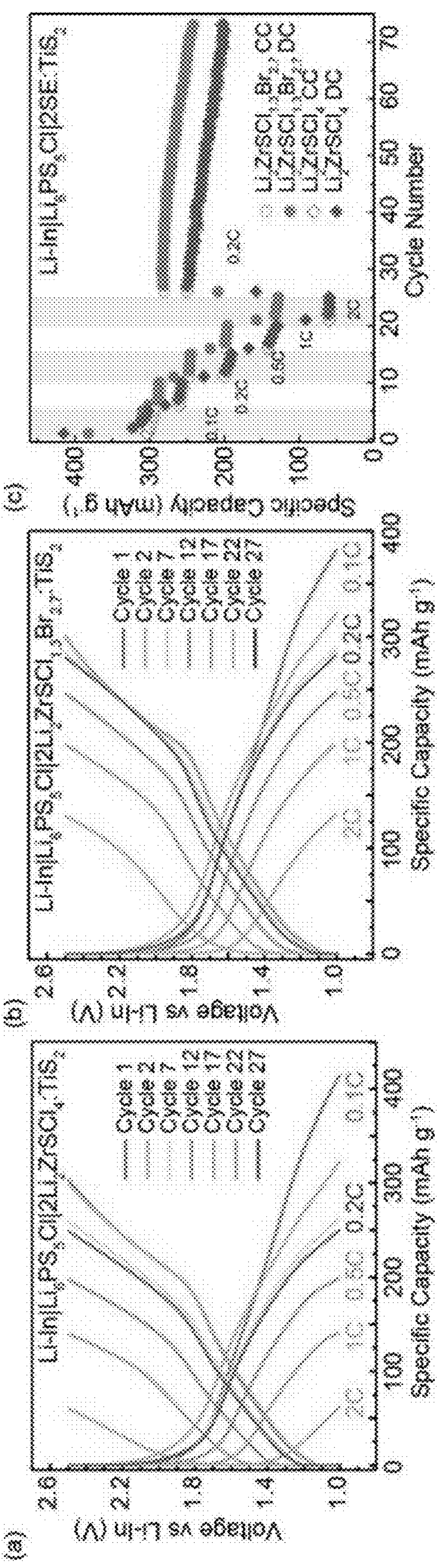
FIGS. 11A-11C show the voltage profile of (a) $Li_2ZrSCl_4$ (b) $Li_2ZrSCl_{1.3}Br_{2.7}$, and (c) the corresponding cycling rate performance.

When employed as a catholyte, $Li_2ZrSCl_{1.3}Br_{2.7}$ demonstrated excellent cycling performance. The assembled all-solid-state-battery half-cell comprises $TiS_2$:$2Li_2ZrSCl_{4-x}Br_x$ cathode composite, Li—In anode, and a $Li_6PS_5Cl$ separator. An initial discharge capacity of 420 and 390 mAh $g^{-1}$ were obtained at 0.1 C for $Li_2ZrSCl_4$ and $Li_2ZrSCl_{1.3}Br_{2.7}$, respectively (FIGS. 11A-B). This capacity is higher than the theoretical $TiS_2$ capacity of 256 mAh $g^{-1}$ and it is likely due to the formation of degradation products at the beginning of the cycling. This capacity stabilizes to 325 $mAhg^{-1}$ after the second cycle, and we attribute this to the formation of a passivating layer which benefits the charge-discharge cycles. Specific capacities were determined at charge-discharge rates of 0.1, 0.2, 0.5. 1 and 2 C, with $Li_2ZrSCl_4$ displaying discharge capacities of 323.3, 262.6, 199.5, 141.1, and 63.3 $mAhg^{-1}$ respectively. The corresponding discharge capacities for $Li_2ZrSCl_{1.3}Br_{2.7}$ were 322.2, 289.4, 248.2, 199.5, and 132.6 mAh $g^{-1}$ respectively. The slightly higher capacities exhibited by the $Li_2ZrSCl_{1.3}Br_{2.7}$ cells can be attributed to the higher ionic conductivity and the better utilization of the CAM material, as the Br-doped LZSC SSEs are mechanically softer.

Remarkably, after 70 cycles at 0.2 C, a retention capacity of about 94% was maintained, highlighting the material's cycling stability. $Li_2ZrSCl_{1.3}Br_{2.7}$ maintained a higher specific capacity of 132.6 mAh $g^{-1}$ even at a high C-rate of 2 C, compared to ca. 63.3 $mAhg^{-1}$ of the pristine $Li_2ZrSCl_4$. Both cells displayed good long-term cycling stability over 150 cycles (FIG. 11C), with only marginal capacity fade.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

REFERENCES (1) Wang, Q.; Zhou, Y.; Wang, X.; Guo, H.; Gong, S.; Yao, Z.; Wu, F.; Wang, J.; Ganapathy, S.; Bai, X.; Li, B.; Zhao, C.; Janek, J.; Wagemaker, M. Designing Lithium Halide Solid Electrolytes. *Nat Commun* 2024, 15 (1), 1050. https://doi.org/10.1038/s41467-024-45258-3.

(2) Zhang, S.; Zhao, F.; Chen, J.; Fu, J.; Luo, J.; Alahakoon, S. H.; Chang, L. Y.; Feng, R.; Shakouri, M.; Liang, J.; Zhao, Y.; Li, X.; He, L.; Huang, Y.; Sham, T. K.; Sun, X. A Family of Oxychloride Amorphous Solid Electrolytes for Long-Cycling All-Solid-State Lithium Batteries. *Nat Commun* 2023, 14 (1). https://doi.org/10.1038/s41467-023-39197-8.

(3) Kim, K.; Park, D.; Jung, H. G.; Chung, K. Y.; Shim, J. H.; Wood, B. C.; Yu, S. Material Design Strategy for Halide Solid Electrolytes Li3MX6(X=Cl, Br, and I) for All-Solid-State High-Voltage Li-Ion Batteries. *Chemistry of Materials* 2021, 33 (10), 3669-3677. https://doi.org/10.1021/acs.chemmater.1c00555.

(4) Park, K. H.; Kim, S. Y.; Jung, M.; Lee, S. Bin; Kim, M. J.; Yang, I. J.; Hwang, J. H.; Cho, W.; Chen, G.; Kim, K. S.; Yu, J. Anion Engineering for Stabilizing Li Interstitial Sites in Halide Solid Electrolytes for All-Solid-State Li Batteries. *ACS Appl Mater Interfaces* 2023. https://doi.org/10.1021/acsami.3c13002.

(5) Li, X.; Liang, J.; Yang, X.; Adair, K. R.; Wang, C.; Zhao, F.; Sun, X. Progress and Perspectives on Halide Lithium Conductors for All-Solid-State Lithium Batteries. *Energy and Environmental Science*. Royal Society of Chemistry 2020, pp 1429-1461. https://doi.org/10.1039/c9ee03828k.

(6) Kwak, H.; Han, D.; Lyoo, J.; Park, J.; Jung, S. H.; Han, Y.; Kwon, G.; Kim, H.; Hong, S. T.; Nam, K. W.; Jung, Y. S. New Cost-Effective Halide Solid Electrolytes for All-Solid-State Batteries: Mechanochemically Prepared $Fe^{3+}$-Substituted $Li_2ZrCl_6$. *Adv Energy Mater* 2021, 11 (12). https://doi.org/10.1002/aenm.202003190.

(7) Li, B.; Li, Y.; Zhang, H. S.; Wu, T. T.; Guo, S.; Cao, A. M. Fast Li+-Conducting Zr4+-Based Oxychloride Electrolyte with Good Thermal and Solvent Stability. *Sci China Mater* 2023, 66 (8), 3123-3128. https://doi.org/10.1007/s40843-023-2434-4.

(8) Hu, L.; Wang, J.; Wang, K.; Gu, Z.; Xi, Z.; Li, H.; Chen, F.; Wang, Y.; Li, Z.; Ma, C. A Cost-Effective, Ionically Conductive and Compressible Oxychloride Solid-State Electrolyte for Stable All-Solid-State Lithium-Based Batteries. *Nat Commun* 2023, 14 (1). https://doi.org/10.1038/s41467-023-39522-1.

(9) Wang, J.; Chen, F.; Hu, L.; Ma, C. Alternate Crystal Structure Achieving Ionic Conductivity above 1 MS $Cm^{-1}$ in Cost-Effective Zr-Based Chloride Solid Electrolytes. *Nano Lett* 2023, 23 (13), 6081-6087. https://doi.org/10.1021/acs.nanolett.3c01468.

(10) Umeshbabu, E.; Maddukuri, S.; Hu, Y.; Fichtner, M.; Munnangi, A. R. Influence of Chloride Ion Substitution on Lithium-Ion Conductivity and Electrochemical Stability in a Dual-Halogen Solid-State Electrolyte. *ACS Appl Mater Interfaces* 2022, 14 (22), 25448-25456. https://doi.org/10.1021/acsami.2c04160.

(11) Zeier, W. G.; Schlem, R.; Banik, A.; Eckardt, M.; Zobel, M. $Na_{3-x}$Er1-xZrx$Cl_6$-A Halide-Based Fast Sodium-Ion Conductor with Vacancy-Driven Ionic Transport. *ACS Appl Energy Mater* 2020, 3 (10), 10164-10173. https://doi.org/10.1021/acsaem.0c01870.

(12) Maughan, A. E.; Ha, Y.; Pekarek, R. T.; Schulze, M. C. Lowering the Activation Barriers for Lithium-Ion Conductivity through Orientational Disorder in the Cyanide Argyrodite $Li_6PS_5CN$. *Chemistry of Materials* 2021, 33 (13), 5127-5136. https://doi.org/10.1021/acs.chemmater.1c01170.

(13) Lunghammer, S.; Ma, Q.; Rettenwander, D.; Hanzu, I.; Tietz, F.; Wilkening, H. M. R. Bulk and Grain-Boundary Ionic Conductivity in Sodium Zirconophosphosilicate $Na_3Zr_2(SiO_4)_2PO_4$ (NASICON). *Chem Phys Lett* 2018, 701, 147-150. https://doi.org/10.1016/j.cplett.2018.04.037.

(14) Tanaka, Y.; Ueno, K.; Mizuno, K.; Takeuchi, K.; Asano, T.; Sakai, A. New Oxyhalide Solid Electrolytes with High Lithium Ionic Conductivity >10 MS $Cm^{-1}$ for All-Solid-State Batteries. *Angewandte Chemie—International Edition* 2023, 62 (13). https://doi.org/10.1002/anie.202217581.

(15) Shi, X.; Zeng, Z.; Sun, M.; Huang, B.; Zhang, H.; Luo, W.; Huang, Y.; Du, Y.; Yan, C. Fast Li-Ion Conductor of $Li_3HoBr_6$ for Stable All-Solid-State Lithium-Sulfur Battery. *Nano Lett* 2021, 21 (21), 9325-9331. https://doi.org/10.1021/acs.nanolett.1c03573.

The invention claimed is:

1. A compound having the formula $A_zM_wS_vCl_{4-y}X_y$, wherein

A is Li, Na, K, or any combination thereof;
M is Zr, Hf, or a combination thereof;
X is Br, I, or a combination thereof;
z is greater than zero to 4.0;
v is greater than zero to 2.0;
y is greater than or equal to zero to 4.0; and
the sum (z+4w−2v) is equal to 4.

2. The compound of claim 1, wherein A is Li or Na.

3. The compound of claim 1, wherein z is 1.0 to 2.0.

4. The compound of claim 1, wherein M is Zr.

5. The compound of claim 1, wherein w is from 0.1 to 1.0.

6. The compound of claim 1, wherein v is from 0.01 to 2.0.

7. The compound of claim 1, wherein X is Br.

8. The compound of claim 1, wherein y is from 0.1 to 4.0.

9. The compound of claim 1, wherein y is zero.

10. The compound of claim 1, wherein the compound is $Li_2ZrSCl_{4-y}Br_y$.

11. The compound of claim 10, wherein y is from 2.0 to 3.0.

12. The compound of claim 1, wherein the compound is $Li_2ZrSCl_4$, $Li_2ZrSCl_{1.4}Br_{2.6}$, or $Li_2ZrSCl_{1.3}Br_{2.7}$.

13. The compound of claim 1, wherein the compound has an ionic conductivity of 0.30 mS/cm to 3.00 mS/cm, an electronic conductivity of $1.00\times10_{-8}$ S/cm to $1.00\times10^{-11}$ S/cm, is conductive over a temperature range of −20° C. to 80° C., and has an activation energy for ion transport of from 0.1 eV to 0.6 eV.

14. A method for making a compound having the formula $A_zM_wS_vCl_{4-y}X_y$, wherein A is Li, Na, K, or any combination thereof;
M is Zr, Hf, or a combination thereof;
X is Br, I, or a combination thereof;
z is greater than zero to 4.0;
v is greater than zero to 2.0;
y is greater than or equal to zero to 4.0; and
the sum (z+4w−2v) is equal to 4;

the method comprising:

(a) combining in the solid state the following components: (i) $A_2S$ selected from the group consisting of $Li_2S$, $Na_2S$, $K_2S$, and any combination thereof; (ii) $MCl_4$ selected from the group consisting of $ZrCl_4$, $HfCl_4$, and a combination thereof; and (iii) $MX_4$ selected from the group consisting of $ZrBr_4$, $ZrI_4$, $HfBr_4$, $HfI_4$, and any combination thereof, to produce a precursor mixture; and (b) mixing the precursor mixture by mechanochemical milling.

15. A compound produced by the method of claim 14.

16. An article comprising the compound of claim 1.

17. The article of claim 16, wherein the article is a battery or component of a battery.

18. The article of claim 17, wherein the article is a solid-state battery.

19. The article of claim 17, wherein the component of the battery is an electrolyte, a separator membrane, or a combination thereof.

20. A sensor for ion detection, comprising the compound of claim 1.

* * * * *